Sept. 30, 1941.  W. L. KAUFFMAN, 2D  2,257,690
WRINGER MECHANISM
Filed March 17, 1937  2 Sheets-Sheet 1
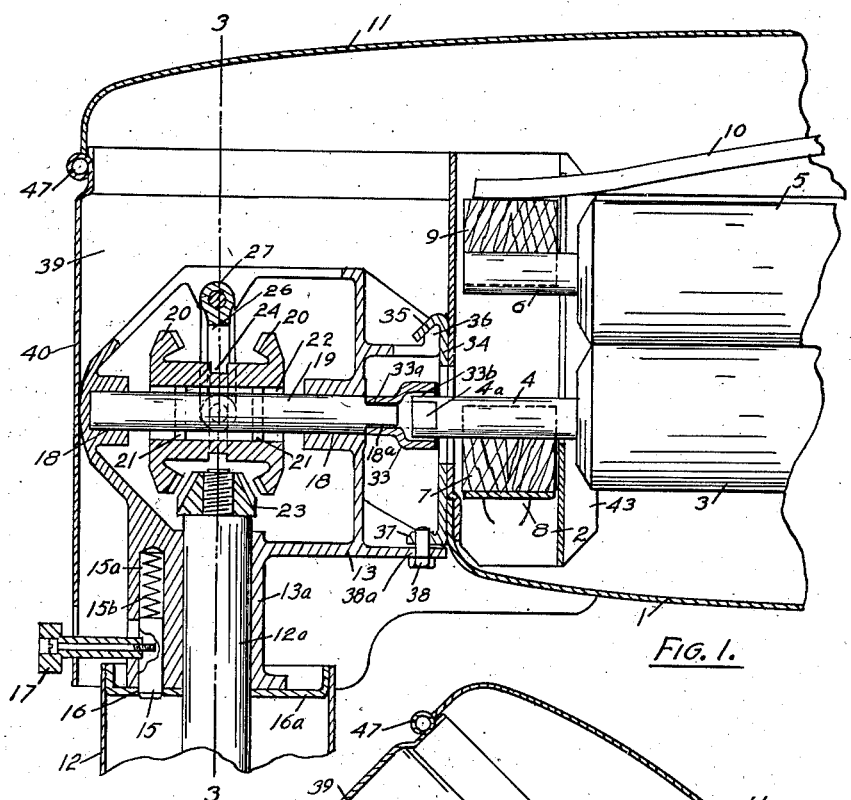

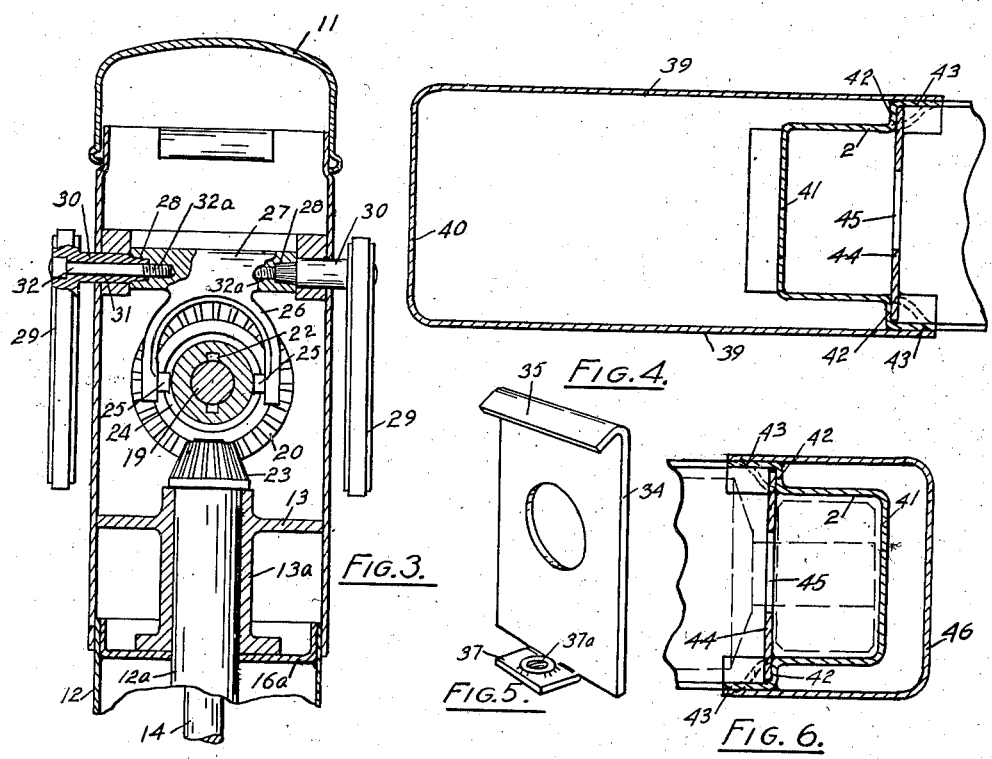

Patented Sept. 30, 1941

2,257,690

UNITED STATES PATENT OFFICE 2,257,690

WRINGER MECHANISM

Walter L. Kauffman, II, Erie, Pa., assignor to Lovell Manufacturing Company, Erie, Pa., a corporation of Pennsylvania Application March 17, 1937, Serial No. 131,335

3 Claims. (Cl. 68—244)

Power wringers are commonly mounted on a post through which power is delivered to the wringer. A driving scheme ordinarily provides a gear for transmitting the motion from an upright shaft extending through the post to a horizontal shaft coupled with one of the wringer shafts. This gear-head may, and usually does, involve a reversing mechanism for reversing the direction in which the wringer is driven and is commonly enclosed in a case and the wringer secured to the gear-head by securing the wringer to the case. Ordinarily the wringer is manufactured separately from the gear-head and the assembly of the parts, particularly in a sightly manner, presents some problem. The present invention is designed to form the case and gear-head separately, the case being secured to the wringer frame and assembled, the gear-head comprising its own frame independently of the case so that in the assembly the case may be put in place over the gear-head and the wringer attached. Other features and details of the invention will appear from the specification and claims.

A preferred embodiment of the invention is illustrated in the accompanying drawings as follows:

Fig. 1 shows a sectional view of the driving end of the wringer including the gear-head.

Fig. 2 a similar view showing the wringer in position, being assumed in the assembly operation.

Fig. 3 a section on the line 3—3 in Fig. 1.

Fig. 4 a sectional view of the gear-head case on the line 4—4 in Fig. 7 showing its attachment to the wringer, Fig. 5 a perspective view of attaching plate securing the wringer frame to the gear-head.

Fig. 6 a sectional view of the end of the wringer frame, opposite the driving end on the line 6—6 in Fig. 7.

Fig. 7 a front elevation of the wringer.

The frame is formed of a base 1 and stiles 2. A lower roll 3 has a shaft 4, and an upper roll 5 has a shaft 6. The shaft 4 is journaled in the lower bearings 7 which are carried by brackets 8 struck up in the stiles. The upper shaft 6 is journaled in bearings 9 slidingly mounted in the stiles. A spring 10 rests on the upper bearings and exerts pressure on the rolls. The spring pressure is adjusted by screw 10a arranged in the top 11. A post 12 supports the wringer. It contains a sleeve or auxiliary post 12a on which is swiveled the gear-head frame 13, the frame having the sleeve 13a journaled on the sleeve 12a. The drive shaft 14 for the wringer extends through the sleeve 12a from the source of power (not shown). A locking pin 15 is slidingly mounted in a socket 15a in the gear-head and is adapted to enter openings 16 in a top plate 16a secured on the post. A handle 17 is fastened to the pin 15 and extends outwardly so that it may be readily grasped in order to lift the pin 15 out of the openings 16 for adjusting the wringer to different positions on the post. A spring 15b yieldingly forces the pin downwardly so as to retain it in the opening 16 to which it is adjusted.

The frame 13 is provided with horizontal shaft bearings 18 in which the gear shaft 19 is journaled. Opposing beveled gears 20 are slidingly mounted on the shaft 19 and locked therewith by pins 21 operating in spline grooves 22. A gear 23 is fixed on the upper end of the shaft 14 between gears 20 and is adapted to be put into mesh with either of the gears 20 by means of a shifting mechanism for the gears 20. This shifting mechanism comprises gear hubs. The connecting hub of the gears 20 is provided with a groove 24 into which extend the trunnions 25. These trunnions are carried by a forked rock arm 26 extending from a base 27. The base 27 has tapered sockets 28, the walls of which are corrugated. Handles 29 have the projections 30, the ends of which are tapered to enter the sockets 28, these tapered ends being corrugated to conform to the corrugations in the sockets. The projections 30 have the perforations 31 through which screws 32 extend and are screwed into screw threaded openings 32a in the base 27. In this way the handles are removable, the screws being accessible from the outer surface of the screws and are locked with the arm 26 so that through the handles the gears may be thrown into and out of mesh. This head and gear structure so far as described is, or may be, of common construction, except that the frame 13 is a skeleton frame and does not involve a case.

The shaft 19 is provided with a drive connection with the shaft 4 of the wringer by clutch 33. This clutch has slots 33a and 33b preferably set at right angles which engage the flattened ends 18a and 4a respectively. The slots 33a and 33b are considerably longer than the diameter of the shafts 18 and 4 so that there is ample play between the parts while at the same time the driving connection is maintained.

A supporting plate 34 is welded on the end of the stile and has a supporting hook 35 at its upper end which engages a shoulder 36 on the head frame. The lower end of the plate has an outwardly extending flange 37 which has a screw-threaded perforation 37a, and a screw 38 extends through a perforation 38a in the frame into the screw-threaded opening 37a. Access to this screw is had from the bottom so as to perfect the assembly.

A case for the gear-head is formed of side walls 39 and end wall 40. The stiles 2 are formed of a channel 41 having the outwardly extending flanges 42 from which extend the inwardly extending flanges 43, the inwardly extending flanges forming the roll guard. Plates 44 are welded to the inner faces of the flanges 42 and have the slots 45 extending downwardly from the top for permitting the assembly of the shafts 4 and 6. The sides 39 of the case are secured either by screws or welding to the flanges or roll guards 43. The case, therefore, may be permanently attached to the wringer, and the wringer including case may be assembled on the head as indicated in Fig. 2 wherein the case is inclined and swung over the head, bringing the hook 35 into position on the shoulder 36. The flattened end 4a of the shaft 4 enters the slot 33b, the length of the slot giving sufficient clearance to permit of the swinging of the flattened end into position in the slot, the parts being brought to the assembled position. The screw 38 is secured, and thus the wringer is securely locked on the head. It will be noted that the relation of the flange 37 and flange 35 is such that the operation of the screw draws the hook into clamped engagement with the shoulder 36.

This enlarged end of the wringer formed by the gear case is balanced at the opposite end by providing an enlarged shell 46 which is secured to the guard flanges 43 in the same manner as the case for the gear-head, and is made to correspond to and balance the wringer frame with relation to the gear-head case. The top 11 is hinged at 47 on the case and is preferably provided with a release device 48 which may be of any common construction, the up-swinging of the top permitting of a release of pressure on the rolls.

This method of providing the gear-head case as a part of the wringer assembly assures a uniformity of finish and material corresponding to the wringer frame and the construction permits of a quick, yet rigid assembly between the wringer frame and the gear-head both for original assembly and for later servicing of the wringer.

What I claim as new is:

1. In a wringer mechanism having a wringer frame, rolls mounted in the frame, one of the rolls having a drive shaft, a gear mechanism for driving the drive shaft, and a head frame for supporting the wringer frame in which head frame the gear mechanism is mounted; the combination with the wringer frame of a case for the head frame mounted on and separable from the head frame with the wringer frame, and a separable cover for the case, said cover being extended to form a detachable top of the wringer frame.

2. In a wringer mechanism having a wringer frame comprising a base and side stiles, rolls mounted in the frame, one of the rolls having a drive shaft, a gear mechanism for driving the drive shaft, and a head frame for supporting the wringer frame and in which the gear mechanism is mounted; the combination with the wringer frame of a case for the head frame mounted on and secured to a stile of the wringer frame, said case extending over and spaced from the front and rear faces of the stile to which it is attached, a case for the opposite end of the wringer frame spaced from the front and rear faces of the stile at that end, and a cover for the wringer frame corresponding in width to the front to rear dimension of the portions of the cases overlapping the front and rear faces of the stiles.

3. In a wringer mechanism having a wringer frame comprising a base and side stiles, the stile at the drive end of the wringer having flanges extending to front and rear and inwardly extending guard flanges on the first mentioned flanges, rolls mounted in the frame, one of the rolls having a drive shaft, a gear mechanism for driving the drive shaft, and a head frame for supporting the wringer frame in which head frame the gear mechanism is mounted; the combination with the wringer frame and head frame of a case for the head frame, said case extending over the sides of the adjacent stile and being secured to the stile flanges.

WALTER L. KAUFFMAN, II.